Patented Feb. 20, 1945

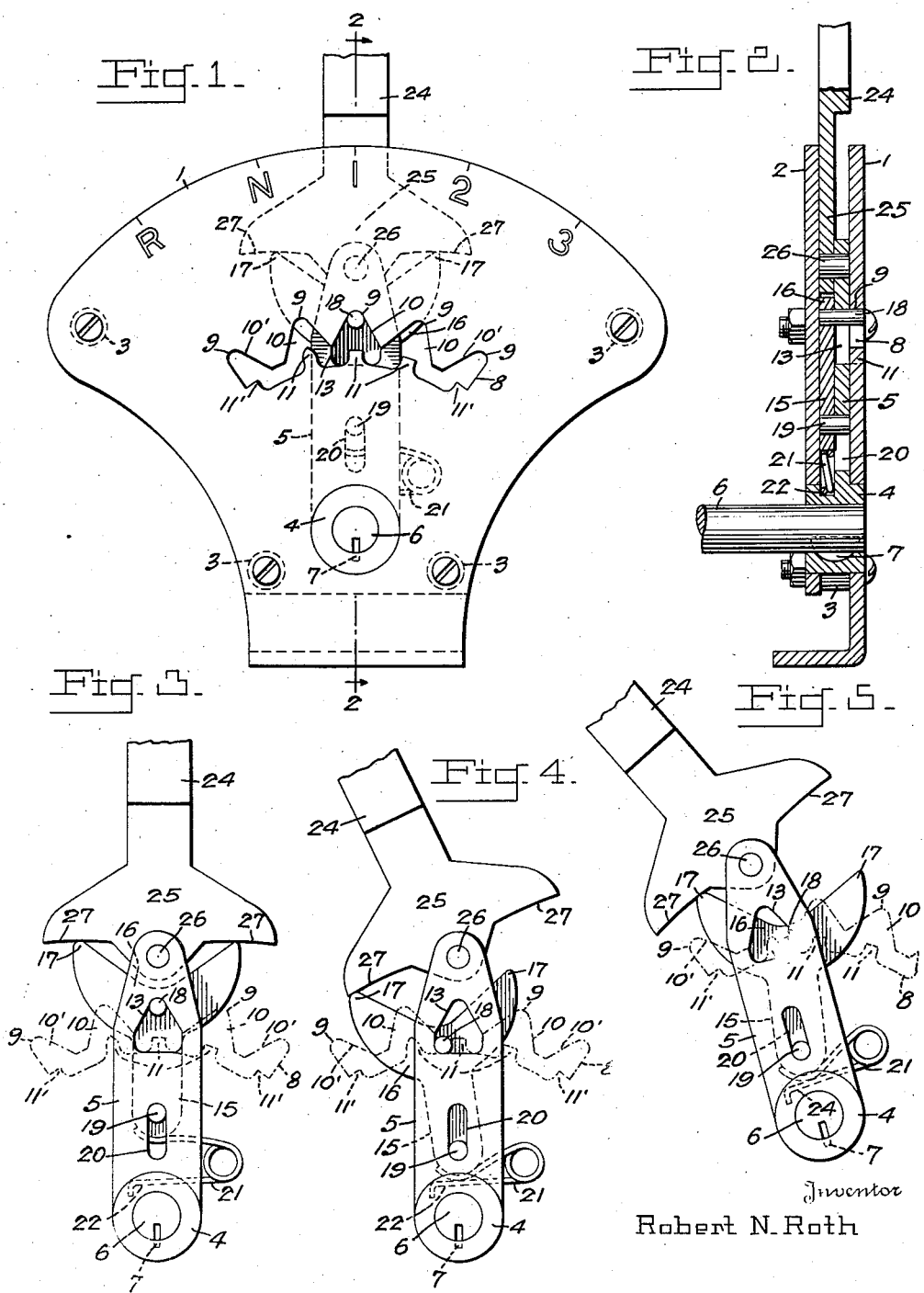

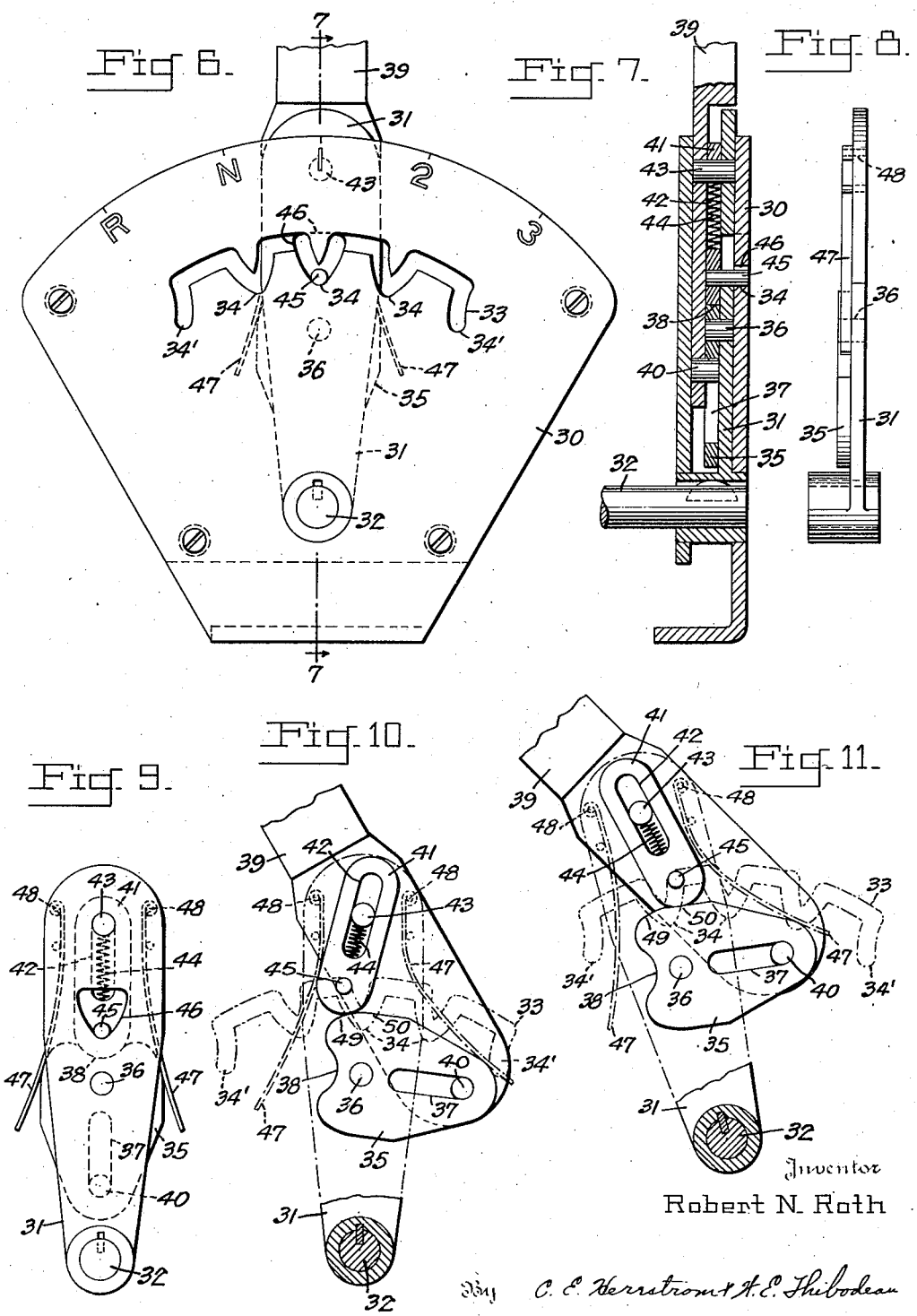

2,369,690

UNITED STATES PATENT OFFICE 2,369,690

POSITION SETTING DEVICE

Robert N. Roth, Akron, Ohio

Application August 3, 1944, Serial No. 547,947

12 Claims. (Cl. 74—565)

(Granted under the act of March 3, 1883, as amended April 30, 1928; 370 O. G. 757)

The invention described herein may be manufactured and used by or for the Government for governmental purposes, without the payment to me of any royalty thereon.

The present invention pertains to a novel device for setting the position of an adjustable member or an adjustable mechanism such as the transmission of a motor vehicle.

In the use of some gear shifting devices, it is possible to skip or by-pass one of the positions or stations, for example, in the conventional H-type gear shift it is possible and quite usual to shift from first gear to third gear without going through second gear. This practice is very undesirable on heavy vehicles such as combat tanks and may result in the stripping of gears.

The object of the present invention is to provide a setting mechanism that does not permit skipping a station. This object is accomplished, generally, by providing a device that is halted automatically at or before each station, requiring a definite release or reversal of the manual force on the actuator before the movement can be continued. Such release or reversal results in engagement of the gears at the particular station and is of such duration that no injury will result from shifting immediately out of that station.

More specifically, the device embodies a handle or lever movable in one plane; in one direction or the opposite, through successive stations. The device functions as a detent at each station. The parts between the handle and the finally adjusted member are of such construction that the handle is automatically arrested at each station and immediately prior to the functioning of the detent. In the movement of the handle, a spring is energized. The handle is positively locked against further movement in the same direction, together with the detent mechanism, but the parts are released by the energized spring when the manual pressure is taken off the handle or the handle is slightly reversed. The movement of the parts under the action of the spring brings the parts securely into one of the stations. The setting may then be changed only by another application of force on the handle. However, the interval in which the device has been held in station before proceeding is sufficient to avoid damage, such as stripping of gears in the case of a gear shift mechanism.

It will be evident that the invention is applicable to other position setting devices and accordingly is not intended to be limited to any particular use or uses.

An illustrative embodiment of the invention is disclosed in the following description and in the accompanying drawings in which:

Figure 1 is an elevation of the device;

Figure 2 is a section on the line 2—2 of Figure 1;

Figure 3 is a detail elevation of the device in a given position;

Figures 4 and 5 are similar elevations showing progressive positions;

Figure 6 is an elevation of a modified construction;

Figure 7 is a section on the line 7—7 of Figure 6;

Figure 8 is a detail elevation in a plane parallel to that of Figure 7;

Figure 9 is a detail elevation of a part in a plane parallel to that of Figure 6, and Figures 10 and 11 are detail elevations of the device in progressive positions.

The device of Figures 1 and 2 is shown as having a housing consisting of pair of spaced plates 1 and 2 assembled by any suitable means such as spacers 3. In the plates is journalled a boss 4 from which extends an arm 5 in the upward direction. The boss 5 receives a gearshift shaft 6 to which it is keyed at 7. Adjustment of the shaft about its axis shifts gears or changes the setting of the transmission control valves from one stage to another. Along its upper edge the housing carries indicia R, N, 1, 2, 3 representing the stages.

In one of the sides of the housing is cut a slot 8 having seats or stations 9 corresponding to the indicia and respectively alined therewith from the center of the shaft 6. Each seat is the apex of a triangular formation 10 in the slot, the end triangles 10' having approximately half the base length of the triangles 10. At each base a tooth 11 or 11' projects from the wall member into the triangular recess for a purpose that will presently be described.

The arm 5 is formed with a triangular opening 13 (Figure 3) adapted to coincide selectively with the triangles 10 and to register with the end triangles 10' on adjustment of the arm, by means that will presently be described, about the axis of the shaft 6.

Behind the arm 5 is mounted a locking pin carrier approximately in the general form of a T-shaped member having a stem 15 and a head 16 presenting a pair of bearing points 17. A locking pin 18 is carried by the head 16 and projects through the triangular opening 13 of the arm 5 into the slot 8 in the housing. A slide pin 19 extends from the stem 15 into an axial slot 20 cut in the lower portion of the arm 5. A coiled wire spring 21 is seated at 22 in the boss 4 and bears upwardly against the lower end of the stem 15.

Finally, an operating handle 24 disposed outside of the housing has a base portion 25 pivotally attached to the upper end of the arm 5 by a pin 26 and is formed with a pair of base shoulders 27 adapted to engage respectively with the bearing points 17 of the locking pin carrier.

In the operation of the device, let it be assumed that the locking pin 18 is to be shifted from its seating position at station No. 1, as shown in Figures 1 and 3, to the next station N to the left. The initial swinging of the handle 24 is actually a counter-clockwise movement thereof about the pin 26, resulting in a similar motion of the carrier 15—17 as well as a depression thereof to move its pin 19 to the bottom of the slot 20. These two movements of the carrier move the locking pin 18 downwardly and laterally out of the seat 9 into one of the base angles of the triangle 10 corresponding to the station No. 1 and in like manner in the coinciding triangular slot 13 of the arm 5.

The handle is fully displaced, as in Figure 5, when it has tilted the carrier to the position where the locking pin 18 is stopped against the next tooth 11. The arm 5, also, has shifted laterally with respect to the locking pin so that the slot 13 now coincides with the triangular opening 10 of the station N. The important function of the slot 13 in this respect is that it permits the lateral swinging of the arm 5 by manual force on the handle 24, so that the coincident slots provide a clear path for the upward movement of the locking pin 18 into the next seat 9. In contradistinction, if the slot 13 had only the width of the slot 20, the device would still be operative in most cases, but the lateral movement of the arm 5 necessary for the next seating position of the pin 18 would result only from a component of force of the spring 21 and would fail to occur in some cases, for example, when the lubricant on the parts is too stiff.

The handle 24 cannot be pushed to the left from the position of Figure 5, unless slightly reversed, since it is bound by the carrier 15—17 and the latter is arrested by the engagement of the pin 18 against the tooth 11. Consequently it is impossible to skip or jump a station by uninterrupted pressure on the handle.

When the manual pressure on the handle is relieved, or slightly reversed, the spring 21 which has been compressed by the aforementioned downward movement of the pin 19 and stem 15, now exerts an upward force on the carrier, seating the pin 18 in the apex of the triangle 10 of station N and returning the carrier and handle 24 to the balanced or symmetrical position relatively to the arm 5, as shown in Figures 1 and 3.

This device is subject to the defect that, in the position of Figure 4, the looseness of the gears associated with the shaft 6 or the action of the usual detent on this shaft is liable to permit the pin 18 to jump over the tooth 11 of the station N and into readiness for seating in station R, thereby skipping station N. This defect is overcome in the construction shown in Figures 6, 7 and 8 which, in general, provides a more positive or incompressible means for guiding the locking pin. This device comprises, as in the previous construction, a housing 30 with an arm 31 therein keyed on the gearshift shaft 32. The pin slot 33 has V-shaped depressions 34 between its ends and semi-V-shaped depressions 34' at its ends constituting the gear-shift stations which are indicated R, N, 1, 2, 3.

The arm 31 has pivotally attached thereto a heart-shaped cam 35 by means of a pin 36. The cam has an axial slot 37 below the pin and a seat 38 above the pin and is symmetrical with respect to the axis of the slot.

The handle 39 extends considerably beyond the pin 36 in order to carry a pin 40 received in the slot 37 of the cam. Between the handle 39 and the arm 31 is mounted a slide 41 having a slot 42 which receives a pin 43 extending from the handle and constituting the main pivot of the handle. A spring is compressed between the pin 43 and the bottom of the slot 42. Another pin 45 is carried by the slide and extends into a triangular slot 46 cut in the arm 31. The slot is adapted to register with any selected station in the pin slot 33. A pair of leaf springs 47 pinned to the arm 31 at 48 bear against opposite sides of the cam 35 and tend to maintain it centered on the arm, in the position shown in Figure 6.

In the operation of the device, let it be assumed that the locking pin is to be moved to the left from the position shown in Figure 6. The initial movement of the handle 39 to the left swings the cam in counter-clockwise direction, as in Figure 10, through the pin 40 and the slot 37, until the pin 40 reaches the end of the slot 37. This movement of the cam first swings the lower end of the slide 41 to the left and then cams the slide upward, moving the pin 45 to the upper left hand corner of the V-slot 34 of station No. 1. In the upward movement of the slide, the spring 44 is compressed. Also, the swinging of the cam places the right hand spring 47 under tension.

The slide 41 rests on one end of an arc of constant radius between the points 49 and 50 on the cam 35. Continued movement of the handle to the left causes the latter to turn with the cam about the pin 36 as an axis while the arc 49, 50 rides under the slide 41 without altering the distance between the pins 36 and 45. The right hand wall of the opening 46 in the arm 31 moves the locking pin 45 to the upper right hand corner of the V-slot of station N. The handle cannot be moved farther to the left, since a responding rotation of the cam would tend to lift the slide through the increasing radius beyond the point 50, and such lifting is obstructed by the engagement of the pin 45 with the upper edge of the opening 46 at the arm 31.

When the manual pressure on the handle is released, the tensioned flat spring 47 swings the cam clockwise and brings the seat 38 in a position to receive the lower end of the slide 41. In this connection it is noted that the curvature of the cam from the point 49 to the point 50 does not increase in radius. This arc is the angle through which the cam must be reversed before permitting displacement of the slide 41 and pin 45. In the restored position the locking pin 45 has dropped to the bottom of the V-slot for station N under the action of the spring 44, and the parts are symmetrical with respect to a line from the axis of the shaft 32 through the locking pin, as in Figure 6.

While specific embodiments of the invention have been shown and been described, it will be understood that various alterations may be made without departure from the spirit of the invention as indicated by the appended claims.

What I claim is:

1. A position setting device comprising a plate having a slot therein, said slot having spaced indentations representing stations of the apparatus to be set, an arm pivotally attached to said plate, a handle arm pivotally connected to the first arm, a locking pin carrier slidably and pivotally mounted on one of said arms and adapted to exert pressure axially on the other arm in the direction of said indentations, spring means acting on said carrier to produce such pressure and to move the pin into a selected indentation, means arresting movement of said handle arm as said pin approaches an indentation, said last mentioned means being releasable on release of the actuating pressure on said handle arm, whereby said spring means slides said carrier to move said pin into the indentation.

2. A position setting device comprising a plate having a slot therein, said slot having spaced indentations representing stations of the apparatus to be set, an arm pivotally attached to said plate, a handle arm pivotally connected to the first arm, a locking pin carrier slidably and pivotally mounted on one of said arms and adapted to exert pressure axially on the other arm in the direction of said indentations, spring means acting on said carrier to produce such pressure and to move the pin into a selected indentation, said carrier being adapted to energize said spring means and to arrest movement of said handle when said locking pin is in advance of one of said indentations, whereby release of the actuating pressure on said handle arm permits said spring means to slide carrier and force said pin into the indentation.

3. A position setting device comprising a plate having a slot therein, said slot having spaced indentations representing stations of the apparatus to be set, an arm pivotally attached to said plate, a handle arm pivotally connected to the first arm, a locking pin carrier slidably and pivotally mounted on one of said arms and adapted to exert pressure axially on the other arm in the direction of said indentations, spring means acting on said carrier to produce such pressure and to move the pin into a selected indentation, said first arm having an opening receiving said pin, means arresting movement of said handle arm as said pin approaches an indentation, said last mentioned means being releasable on release of the actuating pressure on said handle arm, whereby said spring means slides said carrier to move said pin into the indentation.

4. A position setting device comprising a plate having a slot therein, said slot having spaced indentations representing stations of the apparatus to be set, an arm pivotally attached to said plate, a handle arm pivotally connected to the first arm, a locking pin carrier slidably and pivotally mounted on one of said arms and adapted to exert pressure axially on the other arm in the direction of said indentations, spring means acting on said carrier to produce such pressure and to move the pin into a selected indentation, said first arm having an opening receiving said pin, said carrier being adapted to energize said spring means and to arrest movement of said handle when said locking pin is in advance of one of said indentations, whereby release of the actuating pressure on said handle arm permits said spring means to slide said carrier and force said pin into the indentation.

5. A position setting device comprising a plate having a slot therein, said slot having spaced indentations representing stations of the apparatus to be set, an arm pivotally attached to said plate, a handle arm pivotally connected to the first arm, a locking pin carrier slidably and pivotally mounted on one of said arms and adapted to exert pressure axially on the other arm in the direction of said indentations, spring means acting on said carrier to produce such pressure and to move the pin into a selected indentation, said first arm having an opening of a size to cover a selected indentation, means arresting movement of said handle arm as said pin approaches an indentation, said last mentioned means being releasable on release of the actuating pressure on said handle arm, whereby said spring means slides said carrier to move said pin into the indentation.

6. A position setting device comprising a plate having a slot therein, said slot having spaced indentations representing stations of the apparatus to be set, an arm pivotally attached to said plate, said arm having an opening therethrough adapted to register selectively with said indentations, a locking pin carrier slidably mounted relatively to said arm, a locking pin extending from said carrier into said opening and slot, a handle pivotally connected to said arm, means movable with said handle for sliding said carrier, and spring means acting on said carrier and positioned to be energized on movement of said handle, said arm, carrier and handle being dimensioned to bind against further movement as said pin approaches an indentation, said spring means being adapted to release the parts on release of actuating pressure on said handle, whereby to slide said carrier to move said pin into the indentation.

7. A position settling device comprising a plate having a slot therein, said slot having spaced indentations representing stations of the apparatus to be set, an arm pivotally attached to said plate, said arm having an opening therethrough of dimensions adapted to cover said indentations selectively, a locking pin carrier slidably mounted relatively to said arm, a locking pin extending from said carrier into said opening and slot, a handle pivotally connected to said arm, means movable with said handle for sliding said carrier, and spring means acting on said carrier and positioned to be energized on movement of said handle, said arm, carrier and handle being dimensioned to bind against further movement as said pin approaches an indentation, said spring means being adapted to release the parts on release of actuating pressure on said handle, whereby to slide said carrier to move said pin into the indentation.

8. A position setting device comprising a plate having a slot therein, said slot having spaced indentations representing stations of the apparatus to be set, an arm pivotally attached to said plate, said arm having an opening therethrough adapted to register selectively with said indentations, a locking pin carrier slidably mounted relatively to said arm, a locking pin extending from said carrier into said opening and slot, a handle pivotally attached to said arm, said handle having a portion adapted to slide said carrier to its limit on rocking of the handle, whereby to arrest further movement of the handle in the same direction, a spring adapted to be energized on sliding of the carrier by the handle, said pin being positioned to lie at the approach of an indentation when said handle is arrested, whereby release of actuating pressure on said handle permits said spring to slide said carrier and move the pin into the indentation.

9. A position setting device comprising a plate having a slot therein, said slot having spaced indentations representing stations of the apparatus to be set, an arm pivotally attached to said plate, said arm having an opening therethrough of dimensions adapted to cover said indentations selectively, a locking pin carrier slidably mounted relatively to said arm, a locking pin extending from said carrier into said opening and slot, a handle pivotally attached to said arm, said handle having a portion adapted to slide said carrier to its limit on rocking of the handle, whereby to arrest further movement of the handle in the same direction, a spring adapted to be energized on sliding of the carrier by the handle, said pin being positioned to lie at the approach of an indentation when said handle is arrested, whereby release of actuating pressure on said handle permits said spring to slide said carrier and move the pin into the indentation.

10. A position setting device comprising a plate having a slot therein, said slot having spaced indentations representing stations of the apparatus to be set, an arm pivotally attached to said plate, said arm having an opening therethrough adapted to register selectively with said indentations, a handle pivotally connected to said arm, a locking pin carrier slidably mounted on said handle, a locking pin extending from said carrier into said opening and slot, a cam pivotally attached to said arm and having a sliding connection with said handle, spring means positioned to be energized by said cam on pivotal movement thereof, said cam being adapted to engage said carrier and hold said pin at the approach of an indentation at the limit of said sliding connection, whereby to arrest further movement of said handle in the same direction, said energized spring means being adapted to release said cam to permit said pin to enter the indentation.

11. A position setting device comprising a plate having a slot therein, said slot having spaced indentations representing stations of the apparatus to be set, an arm pivotally attached to said plate, said arm having an opening therethrough adapted to register selectively with said indentations, said opening being of a size to cover a selected indentation, a handle pivotally connected to said arm, a locking pin carrier slidably mounted on said handle, a locking pin extending from said carrier into said opening and slot, a cam pivotally attached to said arm and having a sliding connection with said handle, spring means positioned to be energized by said cam on pivotal movement thereof, said cam being adapted to engage said carrier and hold said pin at the approach of an indentation at the limit of said sliding connection, whereby to arrest further movement of said handle in the same direction, said energized spring means being adapted to release said cam to permit said pin to enter the indentation.

12. A position setting device comprising a plate having a slot therein, said slot having spaced indentations representing stations of the apparatus to be set, an arm pivotally attached to said plate, said arm having an opening therethrough adapted to register selectively with said indentations, a handle pivotally connected to said arm, a locking pin carrier slidably mounted on said handle, a locking pin extending from said carrier into said opening and slot, a cam pivotally attached to said arm and having a slot and pin connection with said handle, spring means positioned to be energized by said cam on pivotal movement thereof, said cam being adapted to engage said carrier and hold said pin at the approach of an indentation at the limit of said slot and pin connection, whereby to arrest further movement of said handle in the same direction, said energized spring means being adapted to release said cam to permit said pin to enter the indentation.

ROBERT N. ROTH.